United States Patent [19]
Ishii et al.

[11] Patent Number: 4,708,439
[45] Date of Patent: Nov. 24, 1987

[54] LIQUID CRYSTAL DISPLAY DEVICE WITH PRISM FOR VIEWING

[75] Inventors: Yutaka Ishii, Nara; Kenichi Nakagawa, Tenri; Fumiaki Funada, Yamatokoriyama, all of Japan

[73] Assignee: Sharp Kabushiki Kaisha, Osaka, Japan

[21] Appl. No.: 16,478

[22] Filed: Feb. 17, 1987

Related U.S. Application Data

[63] Continuation of Ser. No. 675,855, Nov. 28, 1984, abandoned.

[30] Foreign Application Priority Data

Nov. 29, 1983 [JP] Japan .................. 58-227294

[51] Int. Cl.$^4$ .................. G02F 1/13; G02B 17/04
[52] U.S. Cl. .................. 350/331 R; 350/112
[58] Field of Search .................. 350/345, 334, 112

[56] References Cited

U.S. PATENT DOCUMENTS

| | | | |
|---|---|---|---|
| 3,811,751 | 5/1974 | Myer | 350/345 |
| 3,840,695 | 10/1974 | Fischer | 350/339 F X |
| 3,887,791 | 6/1975 | Kitchens | 350/112 X |
| 3,910,681 | 10/1975 | Elliot et al. | 350/338 |
| 3,947,091 | 3/1976 | Trcka | 350/345 |
| 4,009,934 | 3/1977 | Goodwin et al. | 350/346 |
| 4,042,294 | 8/1977 | Billings | 350/339 D |
| 4,068,926 | 1/1978 | Nakamura et al. | 350/337 |
| 4,212,048 | 7/1980 | Castleberry | 350/345 X |
| 4,263,594 | 4/1981 | Masucci | 350/345 X |
| 4,367,467 | 1/1983 | Emile | 350/339 R X |
| 4,398,803 | 8/1983 | Pohl | 350/337 X |
| 4,410,887 | 10/1983 | Stolov et al. | 350/339 F X |
| 4,497,543 | 2/1985 | Aoki et al. | 350/349 X |
| 4,519,679 | 8/1985 | Horikiri et al. | 350/345 X |
| 4,522,468 | 6/1985 | Goscianski | 350/337 X |

*Primary Examiner*—Stanley D. Miller
*Assistant Examiner*—David Lewis
*Attorney, Agent, or Firm*—Birch, Stewart, Kolasch & Birch

[57] ABSTRACT

A transmissive type liquid crystal display panel includes a liquid crystal cell including a liquid crystal material layer, a pair of polarizers between which the liquid crystal layer is disposed, for polarizing incident light, and an optical system disposed on a front surface of the display cell, for refracting light transmitted through the liquid crystal cell in an oblique direction having a good contrast image to an observer.

5 Claims, 14 Drawing Figures

BACKGROUND ART

BACKGROUND ART

LIQUID CRYSTAL DISPLAY DEVICE WITH PRISM FOR VIEWING

This application is a continuation of application Ser. No. 675,855 filed on Nov. 28, 1984 now abandoned.

BACKGROUND OF THE INVENTION

The present invention relates to a liquid crystal display device and, more particularly, to a transmissive type twisted-nematic liquid crystal display device which remarkably improves display quality in a black and white image display device or a multi-color image display device.

In recent years, transmissive type twisted-nematic liquid crystal display devices employing three primary color (red, green, and blue) filters have been developed for displaying a multi-color image. To produce a color television using the twisted-nematic liquid crystal display device, driving methods, the construction of the primary color filters, and liquid crystal materials to be employed have been studied. The problem of the above display device is how to obtain clear color and a wide hue. In the display device which is driven by a multiplex driving method, the above problem has not been discussed.

In the display device having the three primary color filters, each single-color filter in each combination of the three primary color (red, green, and blue) filters is disposed at each of picture elements corresponding to the intersections between the X and the Y electrodes arranged in a matrix, and the three primary colors disposed on each of the picture elements are mixed with each other by using an optical shutter effect of liquid crystal in a twisted-nematic mode.

Accordingly, it is required that display characteristics in the twisted-nematic mode on the picture elements must be common or uniform independent of a display portion on the display surface and an observing angle of an observer.

FIG. 1(A) shows a sectional view of a liquid crystal display cell for explaining a operation principle for a multi-color display.

A pair of glass substrates 2 and 2' interposing a liquid crystal material layer 20 is disposed between a pair of polarizers 1 and 1', and transparent electrodes 3 and 3' are formed on the inner surfaces of the glass substrates 2 and 2', respectively. Picture elements are disposed at the intersections between the electrodes 3 and 3' arranged in a matrix. The polarizer 1' functions as an analyzer.

Each single-color filter of red-color filters 4, green-color filters 5, and blue color filters 6 is scattered on each of the transparent electrodes 3' corresponding to the picture elements, respectively.

The liquid crystal material layer 20 contains liquid crystal molecules 7 which are oriented in a twisted-nematic mode.

An alternating voltage is applied to each of the electrodes 3 and 3' from a power source 9 by switching each of switches 8a, 8b, and 8c corresponding to each of the color filters 4, 5, and 6. The orientated direction of liquid crystal molecules interposed in each intersection between the electrodes 3 and 3' changes in response to the alternating voltage.

A light source 10 is arranged behind the liquid crystal display panel. When light from the light source 10 passes through the display panel and the alternating voltage is applied to each of the electrodes 3 and 3' corresponding to the respective color filter through the switch 8a, 8b or 8c, a multi-color can be displayed on the display surface of the display panel.

FIG. 1(B) shows a relationship between a wavelength of light and a light transmittance when each of the switches 8a, 8b, and 8c is turned on and off.

When the switch 8a, 8b, or 8c is turned on, the light having a hue corresponding to one of the primary color filters 4, 5, and 6 relating to the switch turned on has a maximum light transmittance so as to provide multi-colors.

Because the electro-optical characteristics of the liquid crystal panel in the twisted-nematic mode is dependent on an observing angle $\theta$ as shown in FIG. 2, in case where the display panel is observed by the observor 11 confronted with the display surface of the display panel as shown in FIG. 3, in which he notices that display characteristics differ between two picture elements disposed in the vertical direction on the display surface of the display cell or two picture elements disposed in the horizontal direction on the display surface. An angle between the two picture elements disposed in the vertical direction is designated by $\Delta \epsilon$ around the observer 11, and an angle between the two picture elements disposed in the horizontal direction is designated by $\Delta \chi$ around the observer 11. The difference of the display characteristics causes color diffusion and the reduction of a color contrast.

In FIG. 2(A), the liquid crystal molecules close to the glass substrate 2 are oriented in the direction of a vector $\vec{r_1}$, while the liquid crystal molecules close to the glass substrate 2' are orientated in the direction of a vector $\vec{r_2}$. The polarizers 1 and 1' have directions of polarization expressed by vectors P and A, respectively.

The X-, Y-, and Z- coordinates are defined on the display surface of the display panel. The incident direction of light is designated by a vector $B_1$. The observing direction of the observor 11 is designated by a vector $B_2$. An angle $\theta$ represents an angle formed between the observing direction and the Z axis. An angle $\phi$ represents an angle formed between the X axis and a projection of the observing direction vector $B_2$ on an XY coordinate plane.

FIG. 2(B) shows characteristics between a supply voltage and the light transmittance on the angle $\theta$, for example, $\theta = 0, 15, 30, 45$ degrees, when the angle $\phi$ is 45 degrees. The light transmittance is dependent on the observing angle. For example, as the angle $\theta$ becomes greater, a high light-transmittance can be shown by supplying a low voltage.

FIG. 4 shows a sectional view of the conventional transmissive type twisted-nematic display device construction. The twisted-nematic liquid crystal display device comprises a liquid crystal display panel D, a diffuser 12, and a light source 10, and a case member.

The liquid crystal display panel D, and the diffuser 12, and the light source 10 are supported in the case member. The light source 10 such as a fluorecent light source for emitting white color light is disposed behind the display panel.

The diffuser 12 scatters light emitted from the light source 10, and applies the scattered light to the display surface of the display panel D through the liquid crystal material layer.

Because the light in the various directions is supplied to each of the picture elements in the liquid crystal display panel D by scattering the light from the light source 10, the utility factor of incident light becomes low, so that the contrast value may be remarkably reduced to less than the possible maximum contrast value. Thus, in the conventional display device, the reduction of the color contrast cannot be avoided, and it may be difficult to obtain a high quality image or a multi-color image on the display surface of the liquid crystal display panel.

OBJECT AND SUMMARY OF THE INVENTION

Accordingly, it is an object of the present invention to provide a liquid crystal display device which eliminates the above disadvantage, which enhances its display quality and its display contrast.

It is another object of the present invention to provide a transmissive type twisted-nematic liquid crystal display device which can display an image having a high quality and a high contrast.

It is still another object of the present invention to provide a twisted-nematic liquid crystal display device having some primary color filters for a multi-color display which enhances its display quality without color diffusion and the reduction of a display contrast.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to an embodiment of the present invention, a transmissive type liquid crystal display panel comprises a liquid crystal cell including a liquid crystal material layer, a pair of polarizers between which the liquid crystal layer is disposed, for polarizing incident light, and optical means disposed on a front surface of the display cell, for refracting the light passing through the liquid crystal cell in an oblique direction with a good display contrast to an observer.

The display panel, further comprises color filter means disposed on each of picture elements of the liquid crystal cell for providing multi-color. In place of the color filter means, at least one of the polarizers may be a multi-color poralization film for displaying a multi-color image.

The display panel, further comprises second optical means disposed behind the liquid crystal cell for enabling the incident light to be oblique to the liquid crystal cell.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 2A shows the liquid crystal panel.

DETAILED DESCRIPTION OF THE INVENTION

To facilitate more complete understanding of the present invention, the principle of the present invention will be described first.

Figure 5:
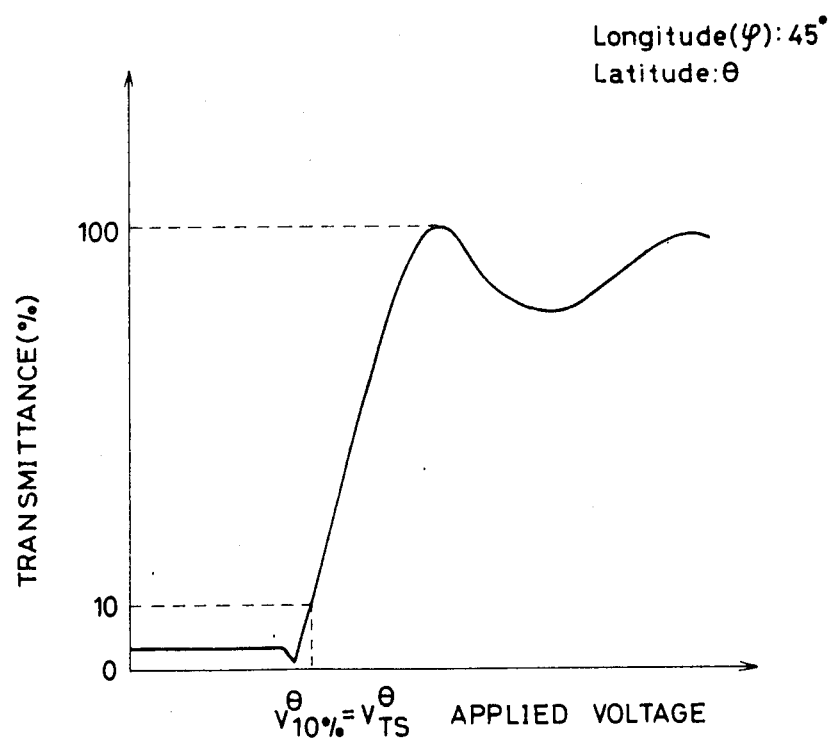
FIG. 5 shows a view for assuming an applied voltage V which is applied to a liquid crystal display panel.
Figure 6:
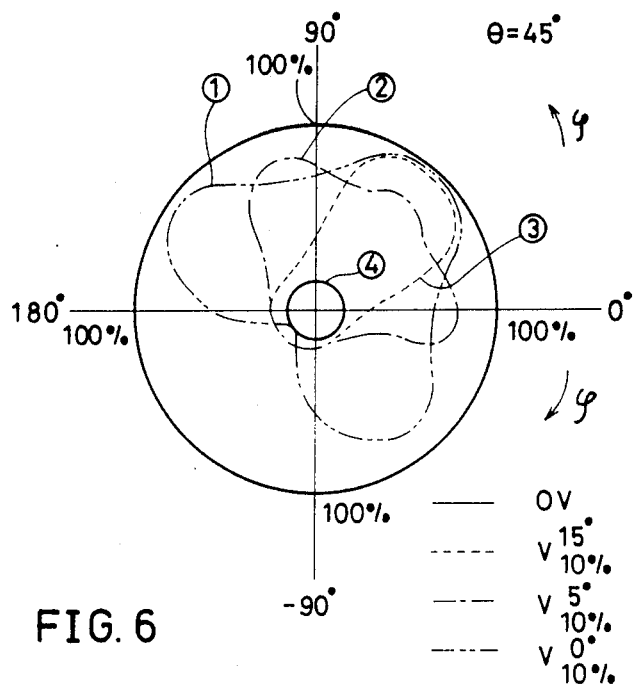
FIG. 6 shows an observing direction dependency of the light transmittance in the twisted-nematic mode.

In the transmission characteristics of the twisted-nematic crystal display panel, if an applied voltage is assumed as shown in FIG. 5, the light transmittance is dependent on an observing angle as shown in FIG. 6.

FIG. 6 shows an observing direction dependency of the light transmitance in the twisted-nematic mode. Voltages $V^{\theta^\circ}{}_{TS}$ (TS: light transmittance) are applied to the display panel as the applied voltages. The threshold voltages $V^{0^\circ}{}_{10\%}$, $V^{5^\circ}{}_{10\%}$, and $V^{15^\circ}{}_{10\%}$ are referred to as voltages when the light transmittance of about 10% are obtained under the conditions of the angles $\theta$ of 0 degree, 5 degrees, and 15 degrees and the angle $\phi$ of about 45 degrees in the best observing direction, respectively. When the angle $\theta$ is constant ($\theta = 45$ degrees), a curve 1 shows a condition where the effective value of the applied voltage is $V^{0^\circ}{}_{10\%}$, and a curve 2 shows a condition where the effective value of the applied voltage is $V^{5^\circ}{}_{10\%}$, and a curve 3 shows a condition where the effective value of the applied voltage is $V^{15^\circ}{}_{10\%}$, and curve 4 shows a condition where the effective value of the applied voltage is $V = 0$.

It will be clear from FIG. 6 that the incident light in the various directions can pass through the display panel on an range of about 270 degrees (about $-90$ degrees $= \phi =$ about 180 degrees) as the applied voltage becomes high and that the incident light is only a specific direction can pass through the display panel as the applied voltage becomes low. Therefore, directivity in the display characteristics can be sharpened by reducing the applied voltage to a voltage more than a threshold voltage.

It will be clear that light in a specific direction can be taken out of light which is incident on each of the picture elements on the display panel in various directions if a preset applied voltage to the display panel is decreased within a range of voltages to a voltage more than the threshold voltage. This is effective in the twisted-nematic liquid crystal display device which includes the primary color filters as a first feature of the present invention.

Figure 3:
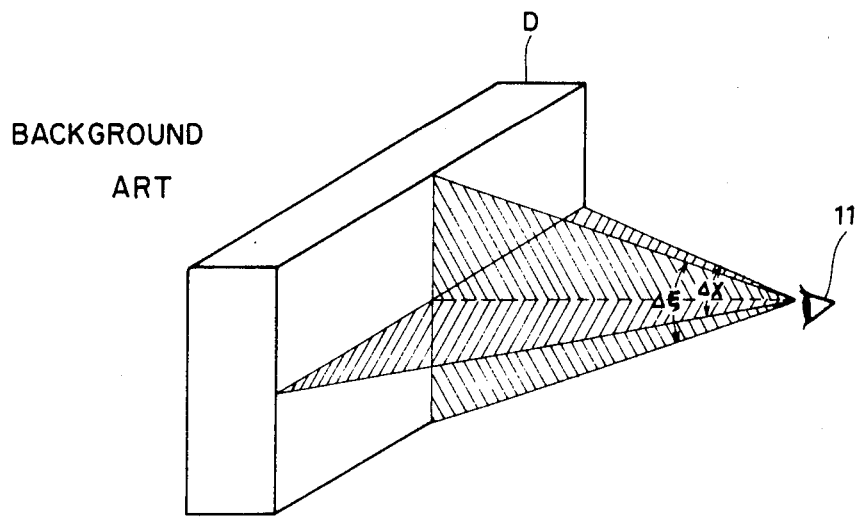
FIG. 3 shows a view for explaining observing angles $\theta$ and $\phi$.
Figure 4:
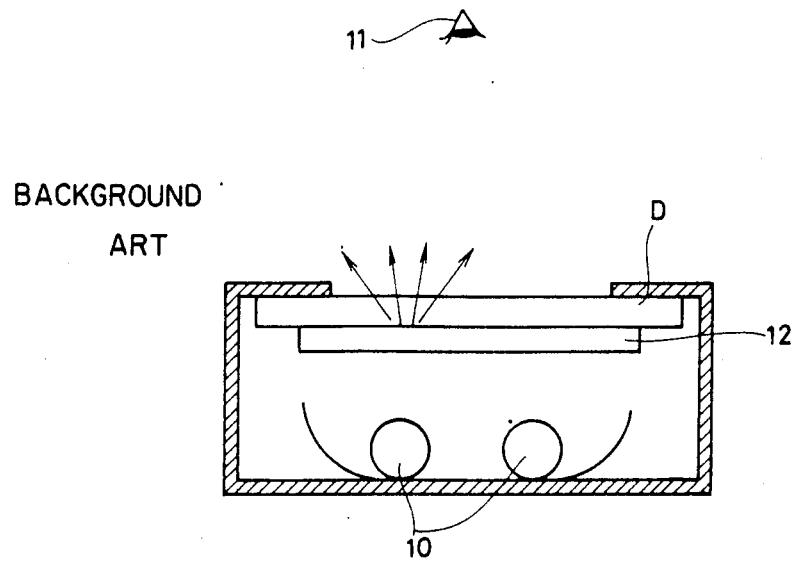
FIG. 4 shows a sectional view of the conventional transmissive type twisted-nematic liquid crystal display panel.

In the device construction as shown in FIGS. 3 and 4, because the display characteristics of the incident light in a specific direction are uniform between the picture elements, only the light passing through the display panel in that specific direction can be used for displaying an image, when the supplied voltage becomes low. In this case, the color diffusion and the reduction of color contrast can be improved.

The applied voltage however, can badly influences the display characteristics; too high a voltage would cause low contrast, and too low a voltage would cause the display to be too dark.

To find out the acceptable maximum of applied voltage, the inventors examined display quality using liquid crystal materials such as biphenyl type liquid crystal, cyclohexene type liquid crystal, estel type liquid crystal, dioxane type liquid crystal, pyrimidine type liquid crystals, and their mixtures.

As a result, the applied voltage may be equal to or less than a threshold voltage (referred to as a voltage when the light transmittance of about 10% is obtained) under the condition of the angle $\theta$ of about 15 degrees and the angle $\phi$ of about 45 degrees in the best observing direction. Therefore, the directionality of the display characteristics can be improved by applying the above applied voltage to the electrodes in the display panel.

As described above, the angle $\theta$ becomes greater so as to obtain the good display contrast, however, the good contrast image cannot be observed by the observer in front of the display surface of the display panel.

To solve the above problem, though the image in the specific direction may be projected on the display surface of the display panel, the following system is effective as a second feature of the present invention.

The incident light in the obilique direction may be refracted in the perpendicular direction against the display surface of the display panel or the observer.

For refraction, a refracting member which refracts the incident light from one direction to another direction may be used for refracting the light. For example, the refracting member may be an optical element such as a prism and a glass fiber plate, and a diffuser, or the like. The refracting member is in contact with the display surface of the display panel to obtain a good display contrast.

If the above refracting member is provided with the liquid crystal display panel, the incident light transmitted through the display panel in the oblique direction is refracted, so that a good contrast image is projected over the display surface of the display panel.

The above construction is effective in producing a compact and pocketable device.

Although the display quality can be improved in comparison with the conventional display device if the above system is applied to the display device, the following method can further improve the display quality.

The twisted-nematic liquid crystal display device cannot completely interrupt the incident light in the various directions even in a possible light cut-off condition in a field-free condition because a part of the incident light can pass through the display panel. In the light cut-off condition, the directions of polarization of the pair of polarizers are parallel to each other.

The problem in the light cut-off condition is dependent on a birefringence ($\Delta n$) of liquid crystal and a thickness (d) of the liquid crystal material layer. As our experimental result shows, part of the incident light can remarkably pass through the display panel in the case where $\Delta n(\lambda).d \lesssim 1.2$ (about 400 nm $\leq \lambda$: wavelength $\leq$ about 700 nm).

In the display device of FIG. 4 in which the diffuser is in contact with the display panel, the part of incident light can pass through the display panel based on the imperfect shutter effect of the liquid crystal even when the display device is driven by a low voltage driving method, so that the reduction of color contrast and the reduction of hue are inevitably caused.

To solve the imperfect shutter effect problem, light incident upon the display panel is emitted in parallel. The parallel incident light passes in the oblique direction, through the display panel as a third feature of the present invention.

Just as the parallel incident light can pass through the display panel in the oblique direction, the incident light can be prevented from escaping in the perpendicular direction through the display surface of the display panel, so that the display characteristics of the picture elements will be uniform and the directionality of the incident light can improve.

Figure 1A:
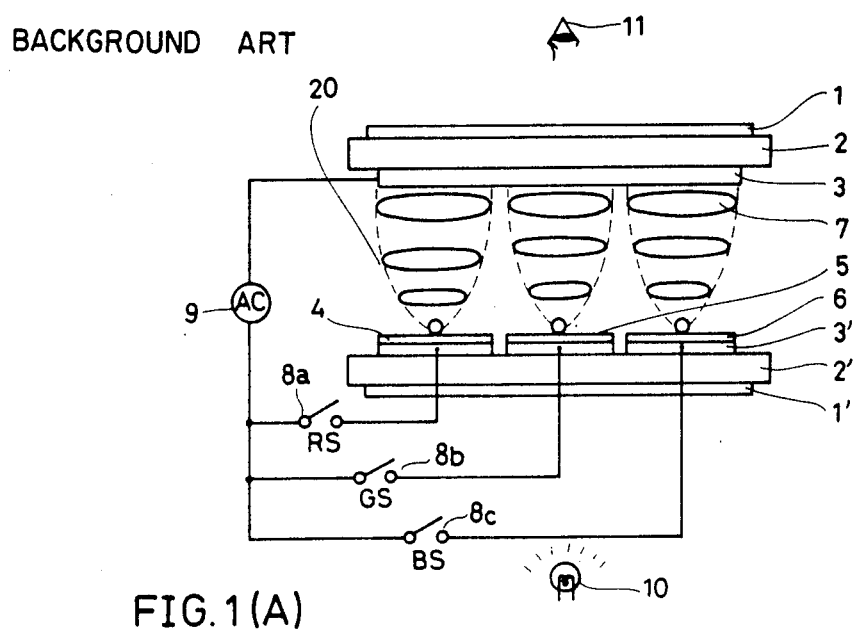
FIG. 1(A) shows a sectional view of a liquid crystal display cell for explaining a operation principle for a multi-color display.
Figure 1B:
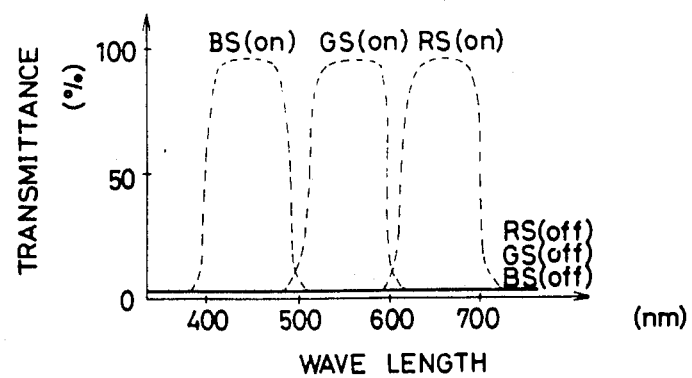
FIG. 1(B) shows a relationship between a wavelength of light and a light transmittance when each of switches $8_a$, $8_b$, and $8_c$ is turned on and off.
Figure 2A:
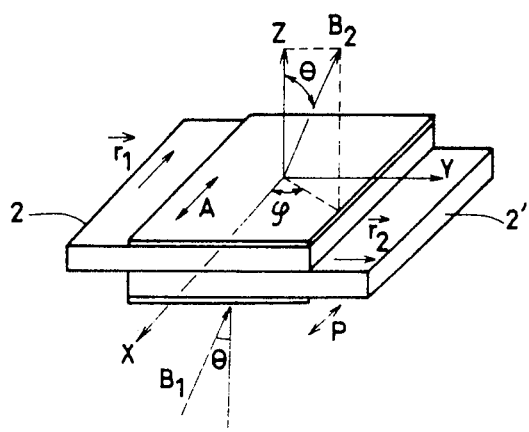
FIG. 2A and B show electro-optical characteristics of liquid crystal panel in the twisted-nematic mode.
Figure 2B:
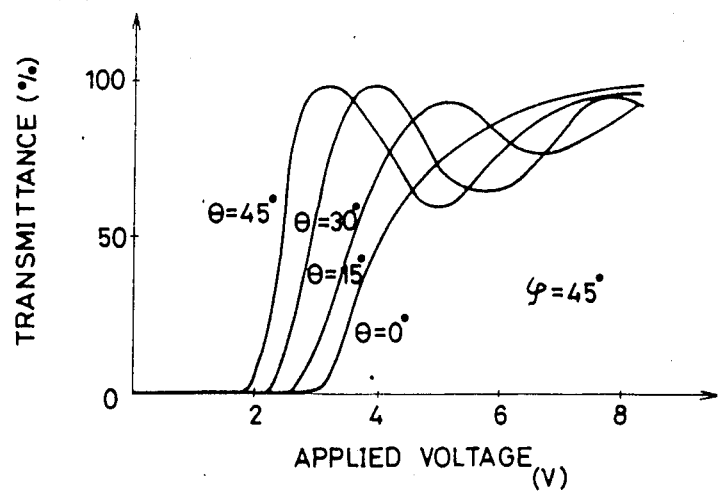
FIG. 2(B) shows characteristics between an applied voltage and the transmittance on the angle $\theta$, for example, $\theta = 0$, 15, 30, and 45 degrees.

It will be clear from FIG. 2, that the display panel can be driven by applying a low voltage with a low operating margin because the low driving voltage causes threshold characteristics to be sharpened. Therefore, the low driving voltage with the low operating margin is effective in multiplex driving.

A louver, a glass fiber plate, and optical systems using a lens or a mirror, etc. may be used for emitting the parallel incident light passing through the display panel in the oblique direction.

The incident angle of the incident light may be within a range from about 15 degrees to about 80 degrees in which the incident angle is formed between a perpendicular line on the display panel and the incident light direction, so as to obtain the good directivity of the display characteristics.

As described above, in the transmissive type twisted-nematic liquid crystal display panel employing some color filters, when the driving voltage condition of the liquid crystal, the transmitted light condition, and the incident light condition are optimized, it is possible to remarkably improve the display characteristics for the multi-color display in comparison with the display characteristics in the conventional panel.

The liquid crystal display panel of the present invention may be used in a display device for an automobile, a graphic display device, a color character display device, a white and black television, or a multi-color television, etc. The member for displaying the multi-color image should not be limited to the primary color filters. For example, a primary color polarizer may be used.

The present invention should not be limited to the multi-color liquid crystal display panel, and is applicable to a mono-color type liquid crystal display panel.

(EXAMPLE I)

Figure 7:
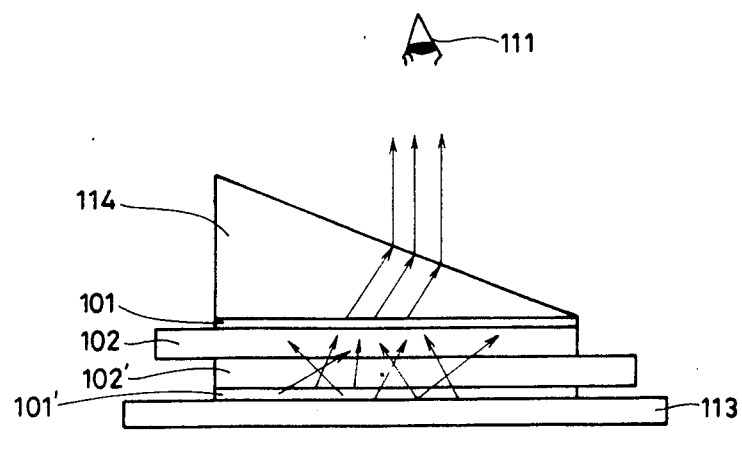
FIG. 7 shows a sectional view of a transmissive type twisted-nematic liquid crystal display panel according to an embodiment of the present invention.

FIG. 7 shows a sectional view of a transmissive type liquid crystal display panel according to an embodiment of the present invention.

An observer 111 is placed in front of the twisted-nematic liquid crystal display panel, which comprises a prism 114, a front polarizer 101, a front glass substrate 102, a rear glass substrate 102', a rear polarizer 101', a light diffuser 113.

A liquid crystal material layer is interposed between the front and the rear substrates 102 and 102'. Front electrodes and rear electrodes are disposed on the inner surfaces of the front and the rear substrates 102 and 102', respectively, and are arranged in a matrix. Each single-color filter of red-color filters, green-color filters, and blue-color filters is scattered and coated on each of portions corresponding to the intersections between the front electrodes and the rear electrodes.

The polarizers 101 and 101' are adhered on the outer surfaces of the front and the rear substrates 102 and 102', respectively.

The liquid crystal material layer contains liquid crystal molecules which are oriented in a twisted-nematic mode. The liquid crystal material used in the embodiment of the present invention is biphenyl/pyrimidine type liquid crystals such as "RO-TN-403" (produced by Hoffmann-La Roche Inc.). The thickness of the liquid cyystal material layer is about 6 μm, and the threshold voltages $V^{0°}_{10\%}$, $V^{15°}_{10\%}$, $V^{30°}_{10\%}$, and $V^{45°}_{10\%}$ of the liquid crystal material are about 2.1 volts, about 1.8 volts, about 1.5 volts and about 1.3 volts, respectively.

The light diffuser 113 is disposed on the rear polarizer 101'. The prism 114 is disposed on the front polarizer 101 on the front of the display surface of the display panel.

Light from a light source arranged behind the display panel is applied to the diffuser 113 so as to scatter the light passing through the diffuser 113.

The scattered light is applied to the display panel. When the scattered light applied to the display panel passes through the display panel, the scattered light changes into uniform light in the oblique direction, and then, the uniform light in the oblique direction is refracted in the front direction of the display panel by the prism 114, so that the observer can observe a possible multi-color image.

Figure 8:
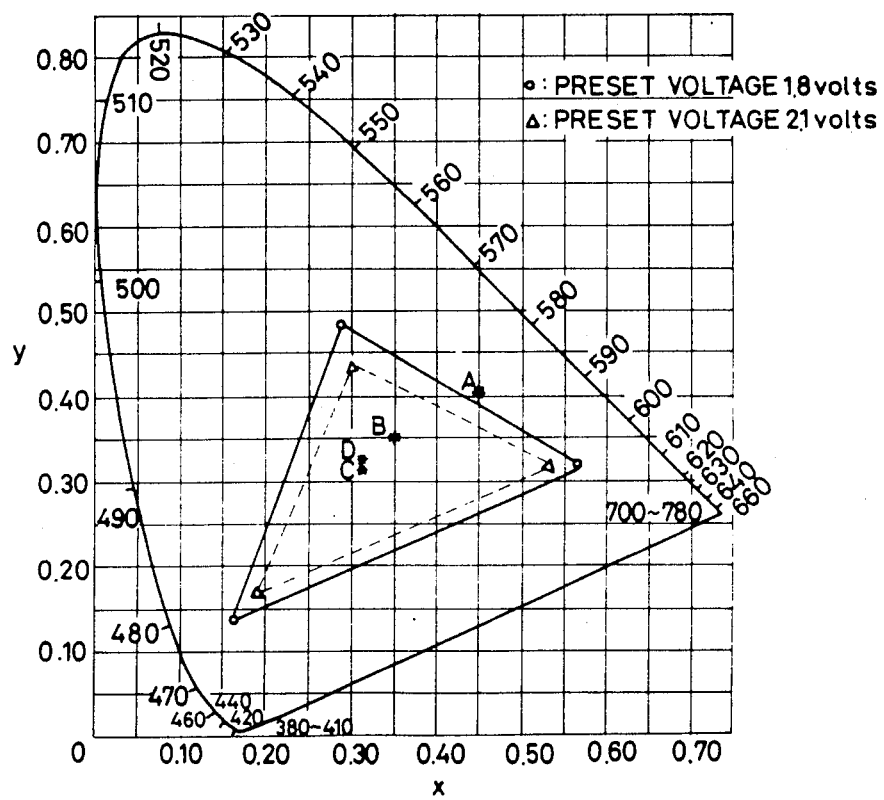
FIG. 8 shows characteristics of the red-color, green-color, and the blue-color in case where the preset applied voltage is set at about 1.8 volts in the panel of FIG. 7.

FIG. 8 shows characteristics of the red-color, the green color, and the blue-color in the case where the preset applied voltage is set at about 1.8 volts in the device of FIG. 7. FIG. 8 shows, also, characteristics of each color in the case where the preset applied voltage is set at about 2.1 volts and the prism 114 is not disposed onto the front polarizer 101. It will be clear from FIG. 8 that the present invention is more effective by comparing the color characteristics of the above two devices.

A glass fiber plate, a light diffuser, a transparent optical sheet such as "NEXY brand transparent sheet" (produced by Nisyogiken Co.), and other optical systems etc. may be used in place of the prism 114. The glass fiber plate comprises a plurality of glass fibers each having a minute diameter, wherein a group of the glass fibers is in a plate shape. The glass fiber plate can refract the oblique incident light in the front direction of the display panel or the observer.

Figure 9A:
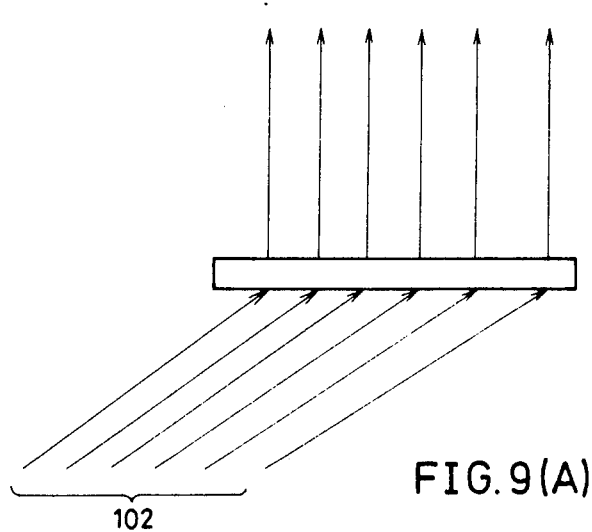
FIG. 9(A) shows a light path of an image magnification film of a light transmissive type in the "NEXY brand transparent sheet"
Figure 9B:
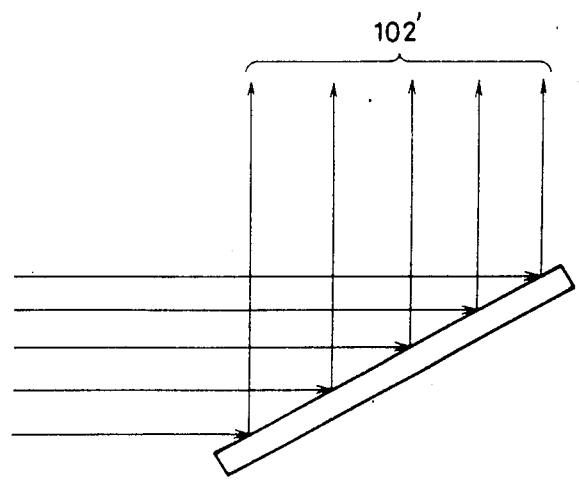
FIG. 9(B) shows a light path of an image magnification of a light reflection type in the "NEXY brand transparent sheet"

FIG. 9(A) shows a light path of an image magnification film of a light transmissive type in the "NEXY brand transparent sheet". FIG. 9(B) shows a light path of a image magnification film of a light reflection type in the "NEXY brand transparent sheet".

(EXAMPLE II)

Figure 10:
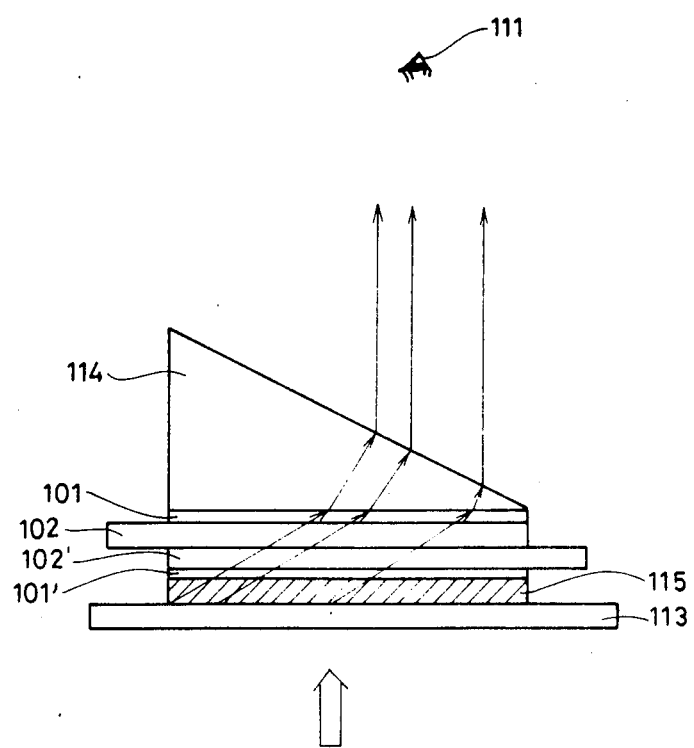
FIG. 10 shows a sectional view of a transmissive type twisted-nematic liquid crystal display panel according to another embodiment of the present invention.

FIG. 10 shows a sectional view of a transmissive type twisted-nematic liquid crystal display panel according to another embodiment of the present invention. Like elements corresponding to the parts of FIG. 7 are denoted by like reference characters in FIG. 10.

A louver 115 is disposed between the diffuser 113 and the polarizer 101'. The louver allows the light to be passed only in the direction of about 60 degrees from the perpendicular line of the louver 115.

As shown in FIG. 10, the incident light emitted from the light source (not shown) can pass through the louver 115 and the liquid crystal display panel, and then be refracted in the front direction of the display panel or the observer by the prism 114.

Figure 11:
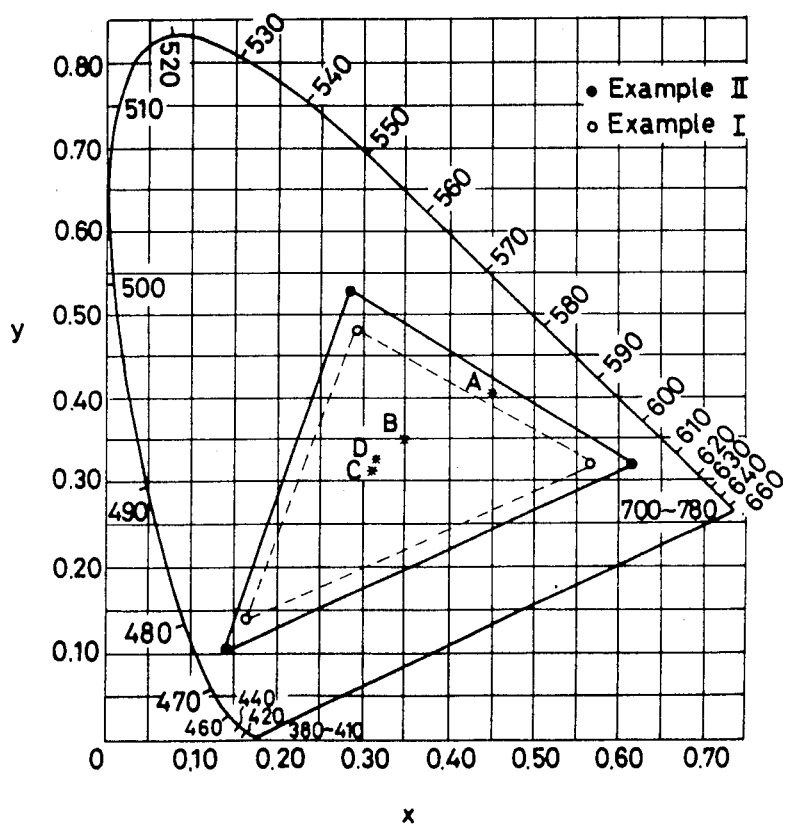
FIG. 11 shows characteristics of the three primary colors in the case where the preset applied voltage is set at about 1.8 volts in the device of FIG. 10.

The liquid crystal material in another embodiment of the present invention is the "RO-TN-403" (produced by Hoffmann-La Roche Inc.). FIG. 11 shows characteristics of the three primary colors in the case where the preset applied voltage is set at about 1.8 volts. FIG. 11 shows, also, the characteristics of the three primary colors in EXAMPLE I as shown in FIG. 8. It will be clear from FIG. 11 that another embodiment of the present invention is more effective than Example I.

In place of the louver 115, there can be used a glass fiber plate which contains a plurality of glass fibers for refracting the oblique incident light, an optical system using a lens or a mirror for preparing the parallel light, and the optical sheets as shown in FIGS. 9(A) and 9(B).

The invention being thus described, it will be obvious that the same may be varied in many ways. Such variations are not to be regarded as a departure from the spirit and scope of the invention, and all such modifcations are intended to be included within the scope of the following claims.

What is claimed is:

1. A transmissive type liquid crystal display panel comprising:
   light diffusing means for scattering light emitted from a light source;
   a liquid crystal cell including,
      a liquid crystal material layer, and
      front and back polarizing means for polarizing scattered light from said light diffusing means which is incident on said back polarizing means, said liquid crystal material layer being interposed between said front and back polarizing means; and
   optical means disposed on a front surface of said liquid crystal cell, for refracting light transmitted through said liquid crystal cell in an oblique direction towards a direction perpendicular to said front surface of said liquid crystal cell,
   whereby said light transmitted through said liquid crystal cell in said oblique direction which is refracted provides improved display contrast.

2. The display device of claim 1, further comprising color filter means disposed on said liquid crystal cell for providing multi-color.

3. The display device of claim 1, wherein at least one of said polarizers is a multi-color polarization film for displaying a multi-color image.

4. The display device of claim 1, further comprising second optical means disposed between said liquid crystal cell and said light diffusing means, for enabling scattered light from said light diffusing means to be oblique upon incidence to said liquid crystal cell.

5. The display device of claim 1, further comprising voltage means for supplying voltage to said liquid crystal cell, said voltage being equal to or greater than a threshold voltage, whereby the directionality of said light transmitted through said liquid crystal cell is sharpened and substantially maximum display contrast is provided in said oblique direction.

* * * * *